US012523242B2

(12) United States Patent
Kroll et al.

(10) Patent No.: US 12,523,242 B2
(45) Date of Patent: Jan. 13, 2026

(54) PIVOT ACTUATOR

(71) Applicant: BAR-PNEUMATISCHE STEUERUNGSSYSTEME GMBH, Dattenberg (DE)

(72) Inventors: Markus Kroll, Dattenberg (DE); Axel Kuhn, Niederbreitbach (DE)

(73) Assignee: BAR-PNEUMATISCHE STEUERUNGSSYSTEME GMBH, Dattenberg (DE)

( * ) Notice: Subject to any disclaimer, the term of this patent is extended or adjusted under 35 U.S.C. 154(b) by 0 days.

(21) Appl. No.: 18/370,254

(22) Filed: Sep. 19, 2023

(65) Prior Publication Data

US 2024/0003364 A1 Jan. 4, 2024

Related U.S. Application Data

(63) Continuation of application No. PCT/EP2022/055023, filed on Feb. 28, 2022.

(30) Foreign Application Priority Data

Mar. 19, 2021 (DE) ..................... 10 2021 106 889.4

(51) Int. Cl.
*F16B 15/06* (2006.01)
*F15B 15/06* (2006.01)
*F15B 15/24* (2006.01)

(52) U.S. Cl.
CPC .............. *F15B 15/06* (2013.01); *F15B 15/24* (2013.01)

(58) Field of Classification Search
CPC ......... F15B 15/06; F15B 15/24; F15B 15/068
(Continued)

(56) References Cited

U.S. PATENT DOCUMENTS 3,592,067 A 7/1971 Hetzer
5,139,230 A 8/1992 Lester
(Continued)

FOREIGN PATENT DOCUMENTS

CN 211202472 8/2020
CN 219062116 U 5/2023
(Continued)

OTHER PUBLICATIONS

Emerson Product Data Sheet, Keystone F89 Pneumatic Quarter-Turn Actuator, General Purpose/Hazardous Area, 2017, pp. 1-16.
(Continued)

*Primary Examiner* — Gregory Robert Weber
(74) *Attorney, Agent, or Firm* — Grossman, Tucker, Perreault & Pfleger, PLLC

(57) ABSTRACT

A pivot actuator includes a housing, a drive shaft rotatably coupled to the housing, a piston within the housing and configured to engage the drive shaft so that movement of the piston along a longitudinal axis of the housing causes the drive shaft to pivot in a first direction about a drive axis within a first pivot angle to a first end position, a first stop element configured to adjustably select the first end position, and a switching cam configured to be coupled to and pivot with the drive shaft about the drive axis. The switching cam includes a first disc having a first stop surface configured to contact the first stop element to limit rotation of the drive shaft in the first direction about the drive axis to the first end position, wherein the first stop surface includes a first convex stop surface.

21 Claims, 6 Drawing Sheets

Figure 1:
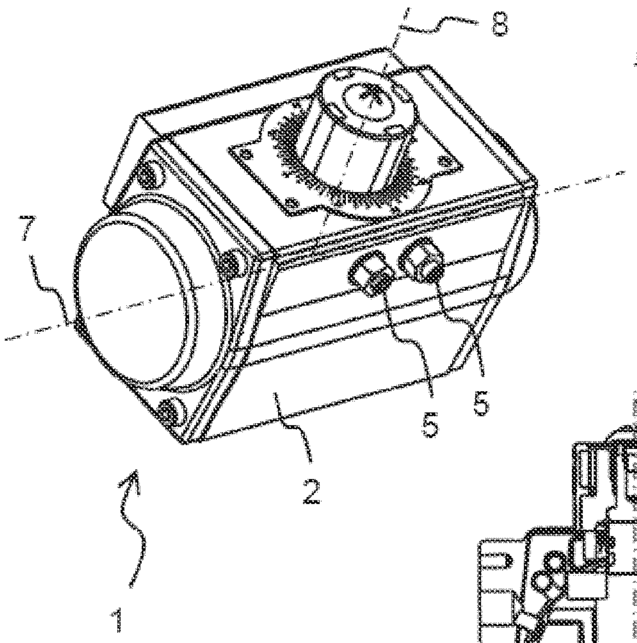

(58) Field of Classification Search
USPC .......................................................... 74/99 R
See application file for complete search history.

(56) References Cited

U.S. PATENT DOCUMENTS

| | | | |
|---|---|---|---|
| 5,259,589 | A | 11/1993 | Posner |
| 6,655,256 | B2 | 12/2003 | Niessen |
| 9,199,358 | B2 | 12/2015 | Balc et al. |
| 2002/0073837 | A1 | 6/2002 | Niessen |
| 2012/0073392 | A1 | 3/2012 | Balc et al. |
| 2017/0145926 | A1 | 5/2017 | Köhler et al. |
| 2017/0146037 | A1 | 5/2017 | Curtin |
| 2021/0080023 | A1 | 3/2021 | Shah |
| 2024/0003364 | A1 | 1/2024 | Kroll et al. |
| 2024/0003365 | A1 | 1/2024 | Kroll et al. |

FOREIGN PATENT DOCUMENTS

| | | | | | |
|---|---|---|---|---|---|
| DE | 10357911 | | | 7/2005 | |
| DE | 102004004897 | | | 8/2005 | |
| DE | 102007012238 | | | 9/2007 | |
| DE | 102009005004 | | | 7/2010 | |
| EP | 2495449 | | | 9/2012 | |
| EP | 2495449 | A1 | | 9/2012 | |
| GB | 2182721 | A | * | 5/1987 | .............. F15B 15/24 |
| GB | 2338748 | A | | 12/1999 | |
| IT | MI20092229 | | | 6/2011 | |
| KR | 102030788 | | | 10/2019 | |
| WO | 2010063515 | | | 6/2010 | |
| WO | 2013164716 | A1 | | 11/2013 | |

OTHER PUBLICATIONS

European Search Report from related Application No. 102021106889.4, dated Apr. 20, 2021. 10 pages. English translation attached.

International Search Report and Written Opinion from corresponding PCT Appln. No. PCT/EP2022/055023, dated May 31, 2022. 9 pages.

International Search Report and Written Opinion from corresponding PCT Appln. No. PCT/EP2022/055024, dated May 31, 2022. 8 pages.

SIL Safety Manual, Keystone Rack and Pinion Pneumatic Actuator F89 Series, Safety Guide R&P—SIL Rev. 1, Feb. 2019, pp. 1-8.

International Preliminary Report on Patentability from corresponding PCT Appln. No. PCT/EP2022/055024, dated Sep. 28, 2023. 7 pages.

European Search Report from related Application No. 102021106889.3, dated Apr. 19, 2021. 20 pages. English translation attached.

Examination Report from European Application No. 22709682.3, Issued by the EPO Oct. 14, 2024. (4 Pages).

Notification of the First Office Action Issued Jun. 9, 2025 from Chinese Patent Application No. 202210264257.2. Machine Generated English Translation attached. 6 Pages.

Search Report from Chinese Patent Application No. 202210264257.2. Machine Generated English Translation Attached. 6 Pages.

* cited by examiner

PIVOT ACTUATOR

CROSS REFERENCE TO RELATED APPLICATIONS

This application is a continuation of International Application No. PCT/EP2022/055023 filed Feb. 28, 2022, which claims priority to DE Application 102021106889.4, filed Mar. 19, 2021, both of which are incorporated by reference herein in their entirety.

The invention relates to a pivot actuator including a housing, a piston that is supported in the housing and displaceable along a longitudinal axis of the housing, a drive shaft that protrudes from the housing, wherein the piston engages the drive shaft by form locking so that the drive shaft is pivoted about a drive axis by a pivot angle to an end position through a displacement of the piston; and a switching cam that is fixed torque proof at the drive shaft and configured to contact a stop element at the housing with a convex contact surface of the switch cam in the end position, wherein the end position is adjustable by an adjustment angle by displacing the stop element along an adjustment axis that is oriented transversal to the drive axis A generic pneumatic pivot actuator is known e.g. under the product the designation "Keystone Figure 89" by Emerson Electric Co Saint Louis, MI/US. The known pivot actuator has a pivot angle of 90 degrees with two defined end positions that are adjustable by stop screws within an adjustment angle range of 10 degrees respectively. S-shaped contact surfaces contact end surfaces of the stop screws with partial surfaces of the S-shaped contact surfaces that extend transversal to the drive axis. An actuation angle of the known pivot actuator is limited by permissible positions of a contact point of the contact surface in the end surface of the contact screw that varies with the adjustment.

Pivot actuators are known in the art that have flat contact surfaces that are arranged at different angles relative to the drive axis after adjustment and that impact the end surfaces which can damage the contact screws.

Object

Thus, it is an object of the invention to increase the adjustment angle

Solution

Improving upon the known pivot actuator it is proposed according to the invention that the contact surface follows an involute of a circle about the drive axis in a direction transversal to the drive axis wherein the circle contacts the adjustment axis. The involute designates a path of an end point of a line segment that is wound from a circumference of the circle and is always oriented perpendicular to the line segment.

Since the adjustment axis and the line segment are tangents to the circle the contact surface of the pivot actuator according to the invention always impacts the same contact point in the end surface of the contact element in a perpendicular direction. Thus, the adjustment angle is not limited by a size of the end surface but only by the installation space that is usable for the contact surface in a radial direction relative to the drive axis. Thus, a pivot actuator according to the invention can provide an adjustment angle of 25°, 30° or more.

Advantageously the adjustment angle of a pivot actuator according to the invention is adjustable by threading the stop element about the adjustment axis. Adjusting the adjustment angle by stop screws is proven and well known in the art. Further advantageously the stop screw is locked at the housing by a lock nut. Alternatively, the stop element can be fixed by clamping devices or by bonding through gluing or soldering at the housing.

Advantageously the switching cam includes a second stop surface in a pivot actuator according to the invention wherein the second stop surface contacts the second stop element arranged at the housing in a second end position of the switching cam. This pivot actuator according to the invention facilitates an exact adjustment of two end positions of a valve, e.g., open and closed.

Advantageously the drive shaft of a pivot actuator according to the invention includes a teething that supports the switching cam torque proof. This couples a movement of the switching cam and of the drive shaft precisely during operations. On the other hand side, the switching cam which is a wear element can be replaced easily.

Advantageously the teething in the pivot actuator according to the invention is rotation symmetrical. Thus, the switching cam can be connected with the drive shaft in plural precisely defined positions. Further advantageously the teething is 8 times rotation symmetrical. A drive shaft of this type with involute teething is known from applicant's product line "agturn".

A pivot actuator according to the invention can include spring elements between the housing and the piston that urge the piston into a neutral position in the range of the pivot angle. A pivot actuator of this type according to the invention reverts to a defined position should a failure occur.

Advantageously a pivot actuator according to the invention includes a pressure tight chamber that is defined by the piston and a fluid connection at the chamber, wherein the piston is displaceable by loading the fluid connection with a fluid. A pivot actuator of this type according to the invention can be driven hydraulically of pneumatically. Alternatively, a pivot actuator according to the invention can be driven electromagnetically or mechanically.

Advantageously a pivot actuator according to the invention includes a second pressure tight second chamber defined by the piston and a second fluid connection at the second chamber, wherein the piston is moveable back and forth by loading the second fluid connection. A position of this pivot actuator according to the invention is controllable by a pressure difference between the first fluid connection and the second fluid connection.

Advantageously a pivot actuator according to the invention includes a second piston that is moveable in the housing along the longitudinal axis wherein the second piston engages the drive shaft by form locking so that the drive shaft is pivoted relative to the first piston when the second piston is moved contrary to the first piston The second piston compensates a bending load that is imparted by the first piston upon the drive shaft and causes a symmetrical force transmission between the piston and the drive shaft. Additionally, the second piston doubles an effective surface that transfers force from the fluid without significantly increasing a size of the pivot actuator. Alternatively, a simpler pivot actuator according to the invention can include only one piston.

Ferrous metals or non-ferrous metals and synthetic materials can be used for the switching cam depending on load conditions.

EMBODIMENTS

The invention is subsequently described based on embodiments with reference to drawing figures, wherein:

FIG. 1 illustrates a pivot actuator according to the invention.

Figure 2A:
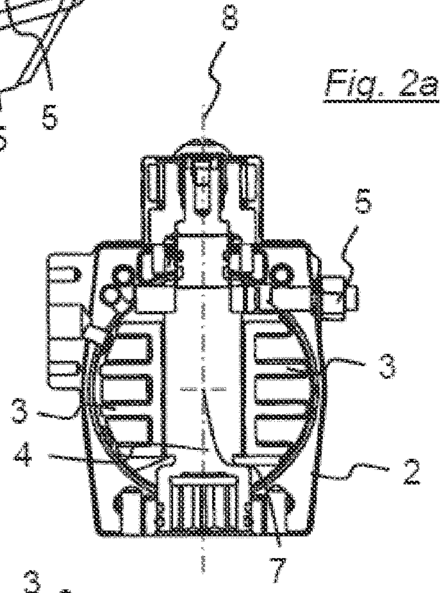
Figure 2B:
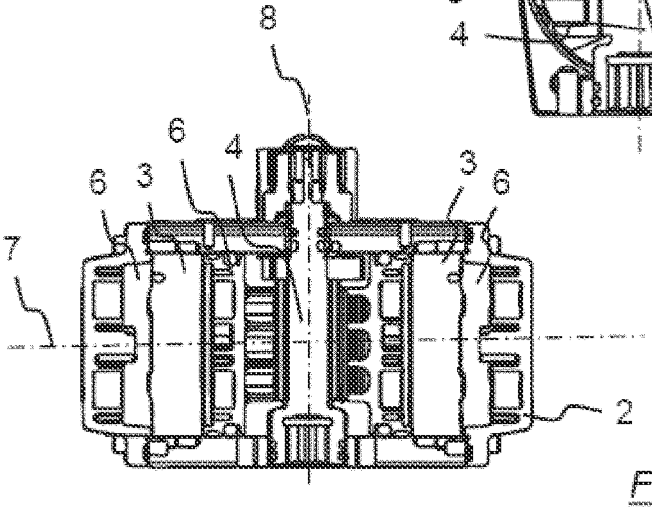
Figure 3A:
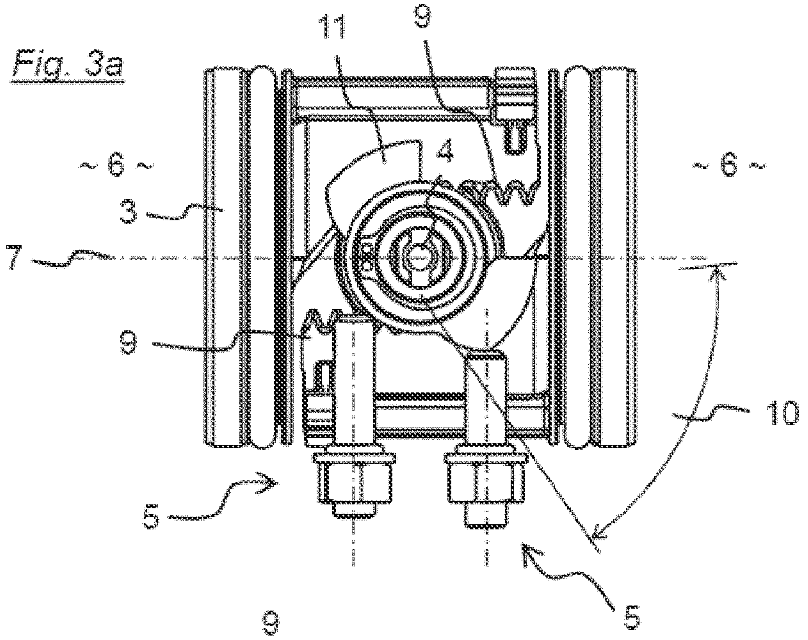
Figure 3B:
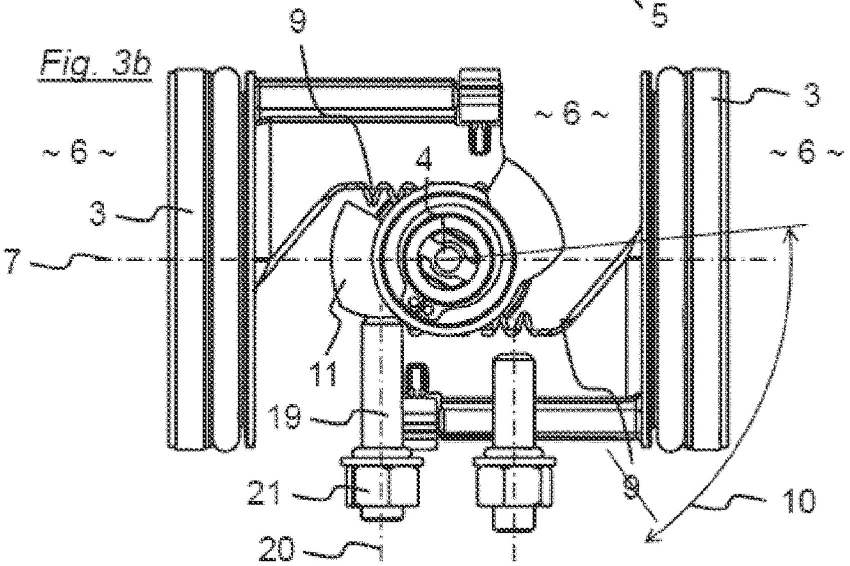
Figure 4A:
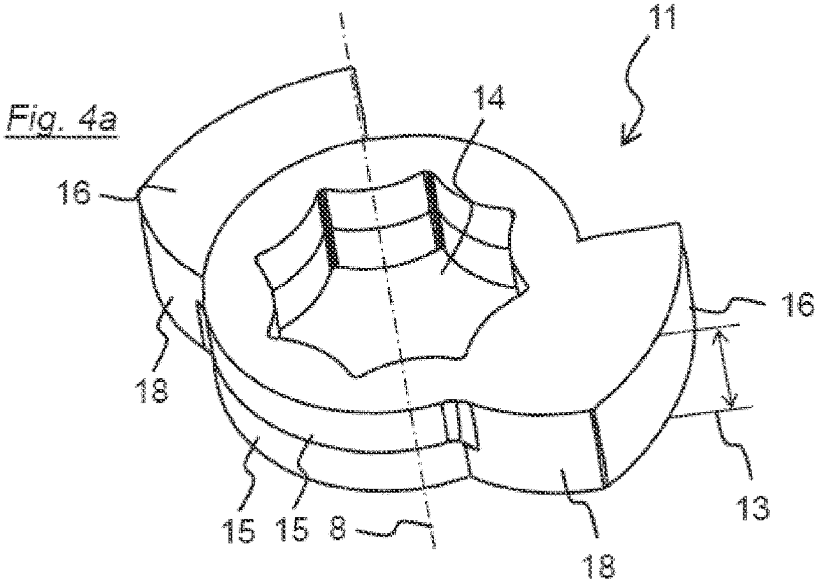

FIG. 2*a/b* illustrates two sectional views of the pivot actuator;

FIG. 3*a/b* illustrates an internal view of the pivot actuator in two end positions;

FIG. 4*a* illustrates a switching cam of the pivot actuator; and

Figure 4B:
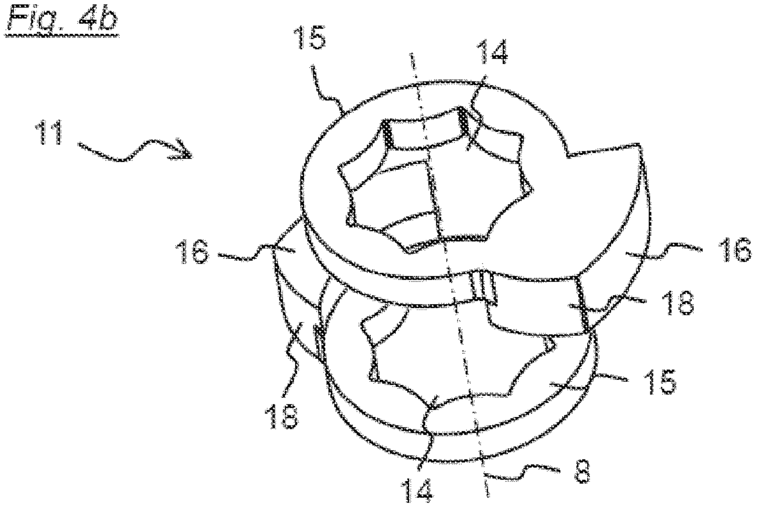

FIG. 4*b* illustrates an exploded view of the switching cam.

Figure 5:
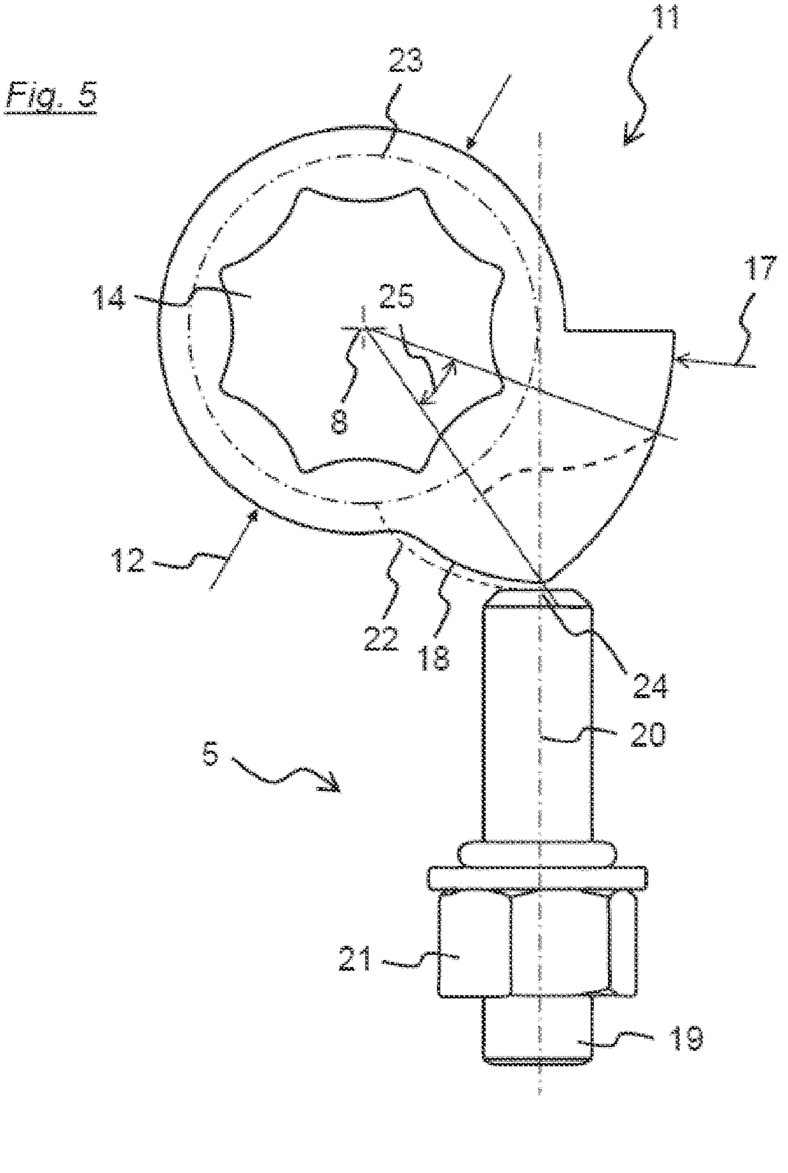
Figure 6A:
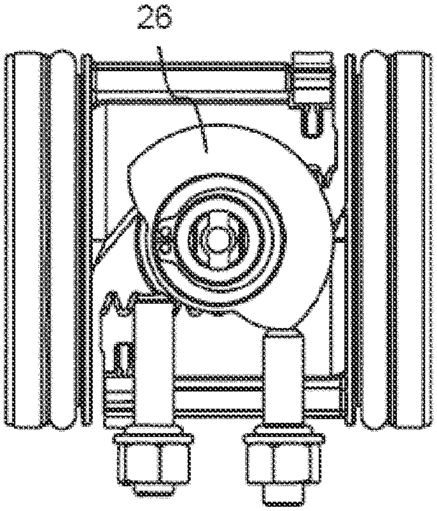
Figure 6B:
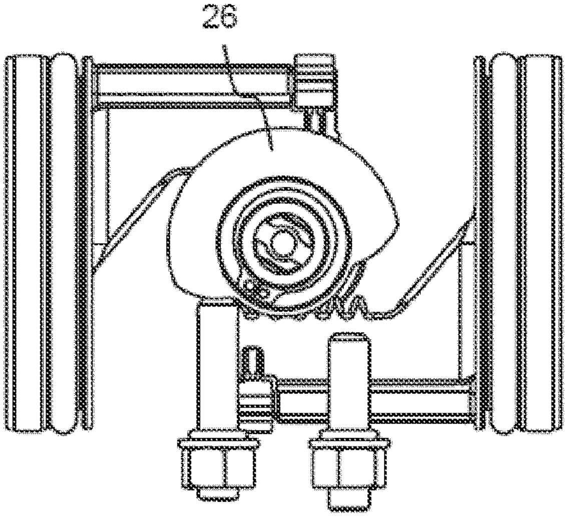
Figure 7:
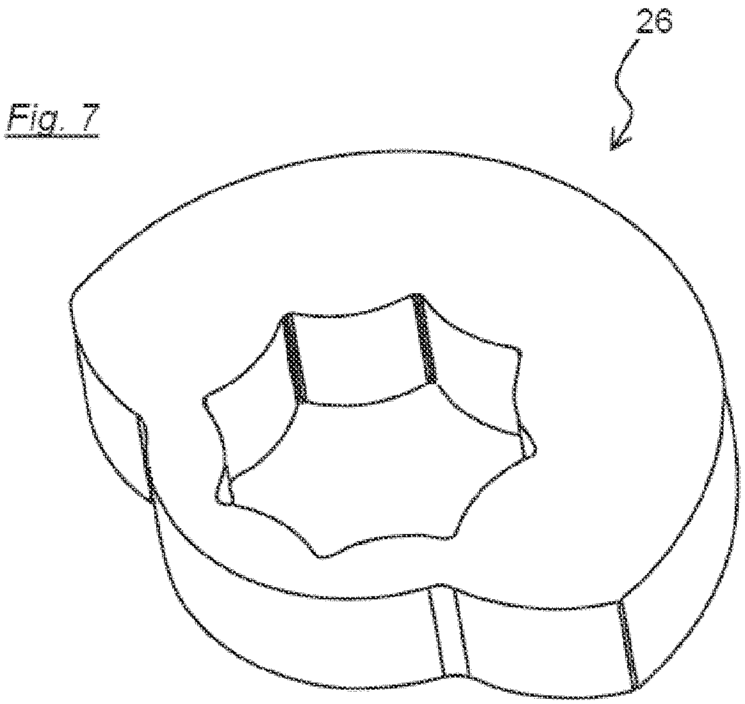

FIG. 5 illustrates a detail of the switching cam;

FIG. 6*a/b* illustrates an internal view of a second pivot actuator according to the invention; and FIG. 7 illustrates the switching cam of the second pivot actuator.

The pivot actuator 1 according to the invention shown in FIGS. 1, 2*a/b* and 3*a/b* includes a housing 2, two pistons 3 included in the housing 2 and a drive shaft 4 that protrudes from the housing 2 and two stop elements 5.

The pistons 3 define one pressure tight chamber 6 between each other and two pressure tight chambers 6 in combination with the housing 2. The pistons 3 are displaceable in the housing 2 counteracting along a longitudinal axis 7 of the housing 2 and the driveshaft 4 is pivotable about a drive axis 8.

The pistons 3 and the driveshaft 4 include teethings 9 that engage each other by form locking. Loading the chamber 6 through non-illustrated pressure connections at the housing 2 with compressed air moves the pistons 3 and the drive shaft 4 is pivoted by the teethings 9 by a pivot angle 10 that is illustrated in FIGS. 3*a/b*, between end positions of 0 degrees and 60 degrees.

A switching cam 11 is attached at the drive axis 8 in the housing 2 and illustrated in detail in FIGS. 4*a/b*, and 5. The switching cam 11 has a circular disc shaped base structure with a diameter 12 of 30 mm and a thickness 13 of 9 mm and includes an axial receiving opening 14. The receiving opening 14 is shaped as an eight pointed star with rounded corners that fixes the switching cam 11 on the drive shaft 4 through a longitudinal teething.

The switching cam 11 includes two identical discs 15 that are rotated relative to each other along the drive axis 8, that are loosely placed on top of each other and made from the case-hardened material 1.0503/C45 respectively including a radial protrusion 16 that has a thickness of the switching cam 11 and a radius 17 of 24.5 mm. A respective contact surface 18 is configured at the protrusion.

The stop elements 5 respectively include a set screw 19 that is threaded into the housing 2 along an adjustment axis 20 and a lock nut 21 that locks the set screw 19 at the housing 2. The stop surface 18 follows an involute 22 about the circle 23 about the drive axis 8 wherein the circle 23 contacts the adjustment axis 20. Thus the contact point 24 in the stop surface 18 is arranged on the adjustment axis 20 in each permissible end position.

FIG. 5 illustrates the switching cam 11 in the maximum permissible end position and in dashed lines in the minimum permissible end position. The first pivot actuator 1 has a nominal pivot angle of 90 degrees. Limits for the end position adjustment for the 0 degree end position of the first pivot actuator 1 are at −5 degrees and +30 degrees, for the 90 degree end position the limits are at 60 degrees and 95 degrees. The adjustment angle 25 of the switching cam 11 between the limits of the end position adjustment is 35 degrees.

FIGS. 6*a/b* show interior views of the end positions for a second pivot actuator according to the invention. The second pivot actuator corresponds to the first pivot actuator besides the switching cam 26 that is illustrated in detail in FIG. 7. Also the switching cam 26 of the second pivot actuator includes the basic structure and the receiving opening 14 of the switching cam 11 of the first pivot actuator 1, however the switching cam 26 of the second pivot actuator is not assembled from discs 15 but fabricated in one piece.

Two other advantageous pivot actuators differ from the first pivot actuator 1 according to the invention only in that one of the discs 15 is pivoted by 45 degrees or 90 degrees about the pivot axis compared to the first pivot actuator 1 according to the invention. The latter two pivot actuators thus have a nominal pivot angle of 135° or 180°.

What is claimed is:

1. A pivot actuator, comprising:

a housing;

a piston disposed within the housing and displaceable along a longitudinal axis of the housing;

a drive shaft rotatably coupled to the housing, wherein the piston engages the drive shaft so that movement of the piston along the longitudinal axis of the housing causes the drive shaft to pivot in a first direction about a drive axis within a first pivot angle to a first end position;

a first stop element configured to adjustably select the first end position; and a switching cam configured to be coupled to and pivot with the drive shaft about the drive axis, the switching cam comprising a first disc including a first stop surface configured to contact the first stop element to limit rotation of the drive shaft in the first direction about the drive axis to the first end position, wherein the first stop surface includes a first convex stop surface;

wherein the first stop surface follows a first involute of a first circle about the drive axis of the drive shaft.

2. The pivot actuator of claim 1, wherein the first end position is adjustably selected by moving the first stop element along a first adjustment axis transversal to the drive axis.

3. The pivot actuator of claim 2, wherein the first involute is arranged in a first direction transversal to the drive axis so that the first circle is tangential to the first adjustment axis.

4. The pivot actuator of claim 1, wherein the first involute is configured to allow the first adjustment angle of at least 25 degrees.

5. The pivot actuator of claim 1, wherein the first involute is configured to allow the first adjustment angle of at least 30 degrees.

6. The pivot actuator of claim 1, further comprising a second stop element configured to adjustably select a second end position;

wherein the piston engages the drive shaft so that movement of the piston along the longitudinal axis of the housing causes the drive shaft to pivot in a second direction about the drive axis within a second pivot angle to a second end position; and wherein the first disc further includes a second stop surface fabricated as one piece with the first stop surface, the second stop surface configured to contact the second stop element to limit rotation of the drive shaft in the second direction about the drive axis to the second end position, wherein the second stop surface includes a second convex stop surface.

7. The pivot actuator of claim 6, wherein the second stop surface follows a second involute of a second circle about the drive axis of the drive shaft.

8. The pivot actuator of claim 7, wherein the second end position is adjustably selected by moving the second stop element along a second adjustment axis transversal to the drive axis.

9. The pivot actuator of claim 8, wherein the second involute is arranged in a second direction transversal to the drive axis so that the second circle is tangential to the second adjustment axis.

10. The pivot actuator of claim 7, wherein the second involute is configured to allow the second adjustment angle of at least 25 degrees.

11. The pivot actuator of claim 7, wherein the second involute is configured to allow the second adjustment angle of at least 30 degrees.

12. A pivot actuator, comprising:

a housing;

a piston disposed within the housing and displaceable along a longitudinal axis of the housing;

a drive shaft rotatably coupled to the housing, wherein the piston engages the drive shaft so that movement of the piston along the longitudinal axis of the housing causes the drive shaft to pivot in a first direction about a drive axis within a first pivot angle to a first end position;

a first stop element configured to adjustably select the first end position; and a switching cam configured to be coupled to and pivot with the drive shaft about the drive axis, the switching cam comprising a first disc including a first stop surface configured to contact the first stop element to limit rotation of the drive shaft in the first direction about the drive axis to the first end position, wherein the first stop surface includes a first convex stop surface;

wherein the piston engages the drive shaft so that movement of the piston along the longitudinal axis of the housing causes the drive shaft to pivot in a second direction about the drive axis within a second pivot angle to a second end position, wherein the pivot actuator further comprises:

a second stop element configured to adjustably select the second end position;

a second disc configured to be coupled to and pivot with the drive shaft about the drive axis, the second disc including a second stop surface configured to contact the second stop element to limit rotation of the drive shaft in the second direction about the drive axis to the second end position, wherein the second stop surface includes a second convex stop surface.

13. The pivot actuator of claim 12, wherein the first disc and the second disc are offset along the drive axis.

14. The pivot actuator of claim 12, wherein an alignment of the first disc relative to the drive shaft is independent from an alignment of the second disc relative to the drive shaft.

15. The pivot actuator of claim 12, wherein the first disc includes a first central region configured to be coupled to the drive shaft and a first radial protrusion extending outwardly from the first central region, the first radial protrusion including the first stop surface;

wherein the second disc includes a second central region configured to be coupled to the drive shaft and a second radial protrusion extending outwardly from the second central region, the second radial protrusion including the second stop surface; and wherein the first and second central regions have a thickness substantially the same as a thickness of the first and second radial protrusions.

16. The pivot actuator of claim 12, wherein the first and second discs are configured to be coupled to and nested along the drive shaft.

17. The pivot actuator of claim 12, wherein the first disc includes a first central region configured to be coupled to the drive shaft and a first radial protrusion extending outwardly from the first central region, the first radial protrusion including the first stop surface and having a thickness that is greater than a thickness of the first central region; and wherein the second disc includes a second central region configured to be coupled to the drive shaft and a second radial protrusion extending outwardly from the second central region, the second radial protrusion including the second stop surface and having a thickness that is greater than a thickness of the second central region.

18. A pivot actuator, comprising:

a housing;

a piston disposed within the housing and displaceable along a longitudinal axis of the housing;

a drive shaft rotatably coupled to the housing, wherein the piston engages the drive shaft so that movement of the piston within the housing causes the drive shaft to pivot in a first direction about a drive axis within a first pivot angle to a first end position and to pivot in a second direction about the drive axis within a second pivot angle to a second end position;

a first stop element configured to adjustably select the first end position;

a second stop element configured to adjustably select the second end position;

a first disc configured to be coupled to and pivot with the drive shaft about the drive axis, the first disc including a first stop surface configured to contact the first stop element to limit rotation of the drive shaft in the first direction about the drive axis to the first end position, wherein the first stop surface follows a first involute of a first circle about the drive axis of the drive shaft;

a second disc configured to be coupled to and pivot with the drive shaft about the drive axis, the second disc including a second stop surface configured to contact the second stop element to limit rotation of the drive shaft in the second direction about the drive axis to the second end position, wherein the second stop surface follows a second involute of a second circle about the drive axis of the drive shaft; and wherein an alignment of the first disc relative to the drive shaft is independent from an alignment of the second disc relative to the drive shaft.

19. A pivot actuator, comprising:

a housing;

a piston disposed within the housing and displaceable along a longitudinal axis of the housing;

a drive shaft rotatably coupled to the housing, wherein the piston engages the drive shaft so that movement of the piston within the housing causes the drive shaft to pivot in a first direction about a drive axis within a first pivot angle to a first end position and to pivot in a second direction about the drive axis within a second pivot angle to a second end position;

a first stop element configured to adjustably select the first end position;

a second stop element configured to adjustably select the second end position;

a first disc configured to be coupled to and pivot with the drive shaft about the drive axis, the first disc including:

a first stop surface configured to contact the first stop element to limit rotation of the drive shaft in the first direction about the drive axis to the first end position, wherein the first stop surface follows a first involute of a first circle about the drive axis of the drive shaft; and a second stop surface fabricated as one piece with the first stop surface, the second stop surface configured to contact the second stop element to limit rotation of the drive shaft in the second direction about the drive axis to the second end position, wherein the second stop surface follows a second involute of a second circle about the drive axis of the drive shaft.

20. A pivot actuator, comprising:

a housing;

a piston disposed within the housing and displaceable along a longitudinal axis of the housing;

a drive shaft rotatably coupled to the housing, wherein the piston engages the drive shaft so that movement of the piston along the longitudinal axis of the housing causes the drive shaft to pivot in a first direction about a drive axis within a first pivot angle to a first end position;

a first stop element configured to adjustably select the first end position; and a switching cam configured to be repeatably removably coupled to and pivot with the drive shaft about the drive axis, the switching cam comprising a first disc including a first stop surface configured to contact the first stop element to limit rotation of the drive shaft in the first direction about the drive axis to the first end position, wherein the first stop surface includes a first convex stop surface.

21. The pivot actuator of claim 20, wherein the first stop surface follows a first involute of a first circle about the drive axis of the drive shaft.

* * * * *